(No Model.) 5 Sheets—Sheet 1.

J. THOMSON.
POSITIVE PROPORTIONAL METER.

No. 476,103. Patented May 31, 1892.

WITNESSES: INVENTOR:

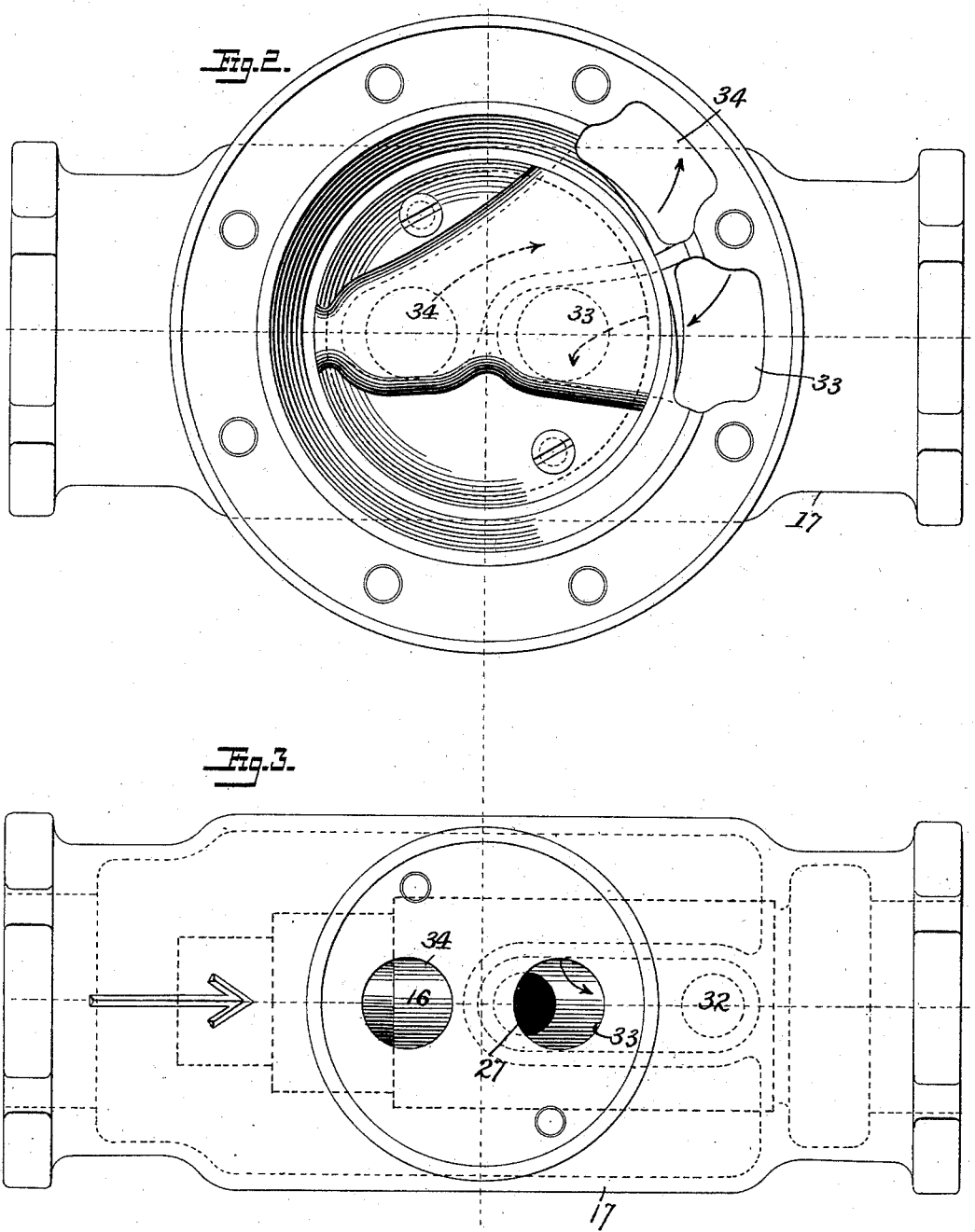

(No Model.)

5 Sheets—Sheet 3.

J. THOMSON.
POSITIVE PROPORTIONAL METER.

No. 476,103. Patented May 31, 1892.

WITNESSES:

INVENTOR:

(No Model.) 5 Sheets—Sheet 4.

J. THOMSON.
POSITIVE PROPORTIONAL METER.

No. 476,103. Patented May 31, 1892.

WITNESSES:

INVENTOR:

(No Model.) 5 Sheets—Sheet 5.
J. THOMSON.
POSITIVE PROPORTIONAL METER.
No. 476,103. Patented May 31, 1892.
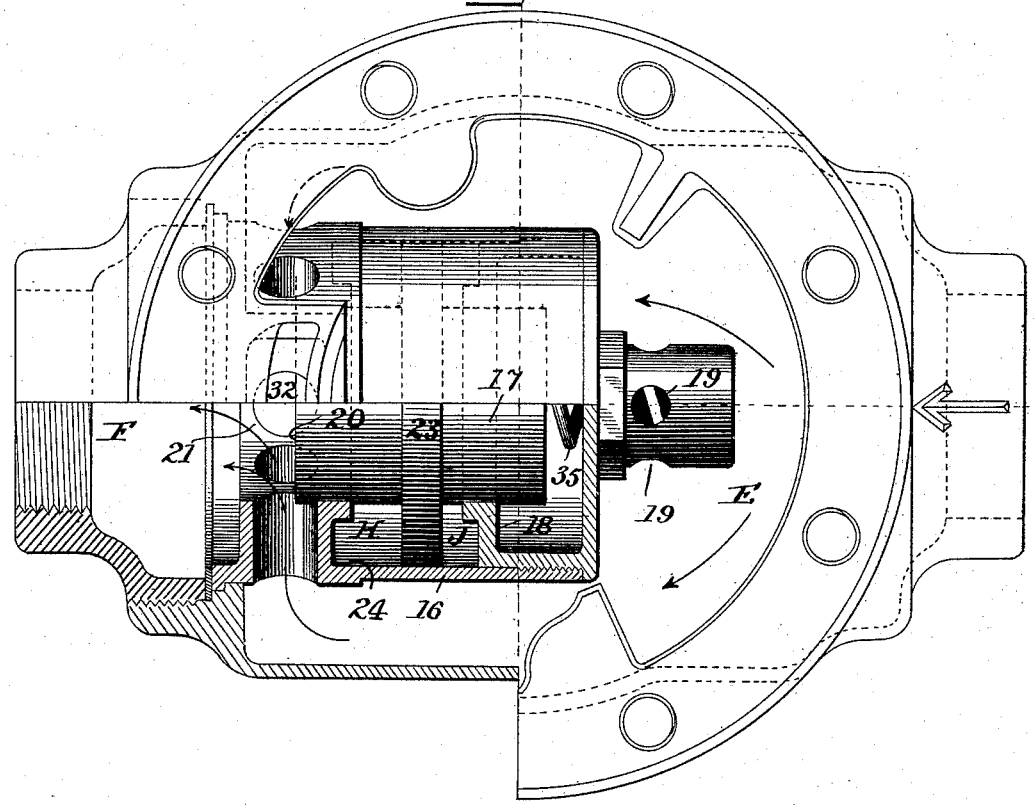
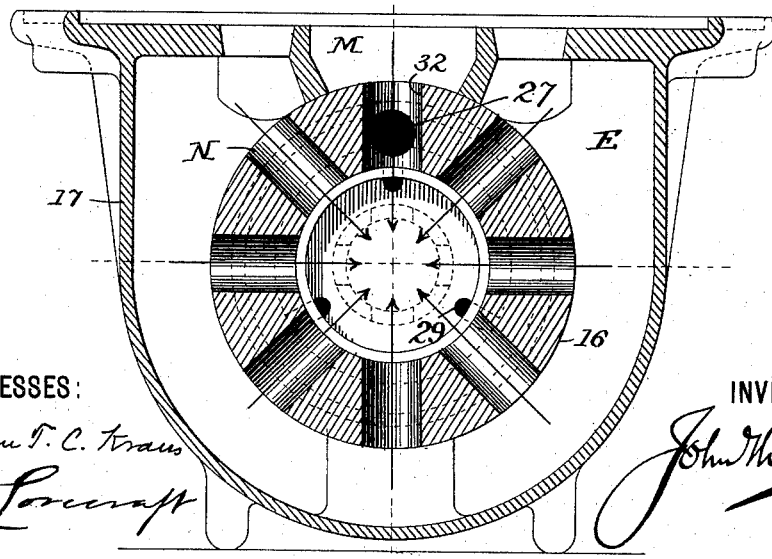
WITNESSES: INVENTOR:

UNITED STATES PATENT OFFICE.

JOHN THOMSON, OF BROOKLYN, NEW YORK.

POSITIVE PROPORTIONAL METER.

SPECIFICATION forming part of Letters Patent No. 476,103, dated May 31, 1892.

Application filed February 18, 1892. Serial No. 422,015. (No model.)

*To all whom it may concern:*

Be it known that I, JOHN THOMSON, a citizen of the United States, and a resident of the city of Brooklyn, Kings county, State of New York, have invented certain new and useful Improvements in Positive Proportional Meters, of which the following is a specification.

This is an invention in positive proportional water-meters; and its object is to provide apparatus capable of indicating the entire quantity by the positive measurement of an aliquot part thereof by causing the ratio of the measured to the unmeasured volume to remain practically constant under all rates of flow and variable conditions of friction, which apparatus is positively operated by the differences of pressure between the different chambers, one of which chambers (to be hereinafter termed the "controlling-chamber") shall receive the discharge from the mechanism employed to measure the aforesaid aliquot part.

The object also is to cause a decrease of pressure in the controlling-chamber to cause a positive corresponding increase in the resistance to the entire flow, and vice versa, upon an increase of pressure therein.

The object, furthermore, is to provide means and conditions whereby the proper operation of the device as a whole shall not be liable to disturbance in its proper function by changes in the velocity of flow.

The means for accomplishing these results, while capable of variation by those skilled in the art without departing from its dominant principles, I have chosen to illustrate in connection with a type and disposal of mechanism such as is disclosed in the accompanying drawings, in which—

Figure 1:
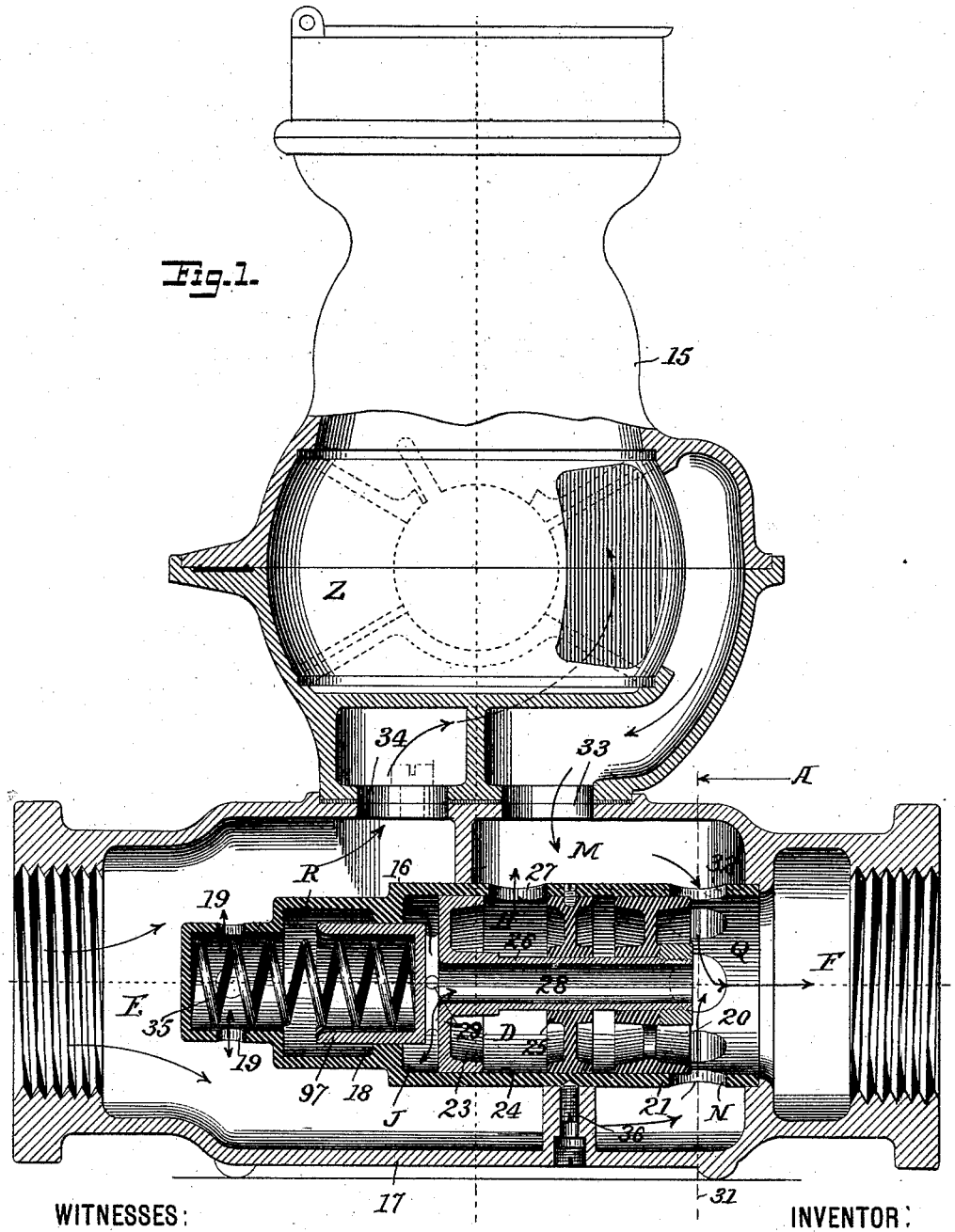
Figure 4:
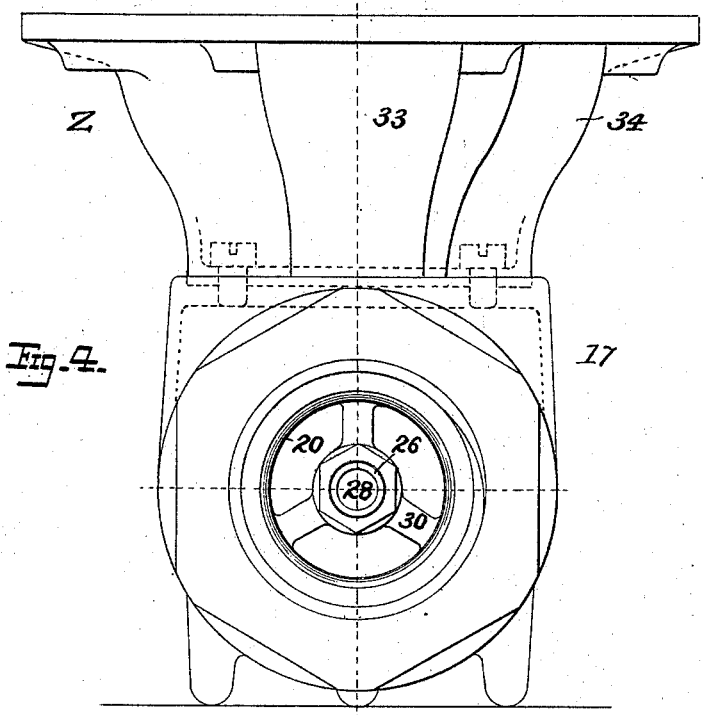
Figure 5:
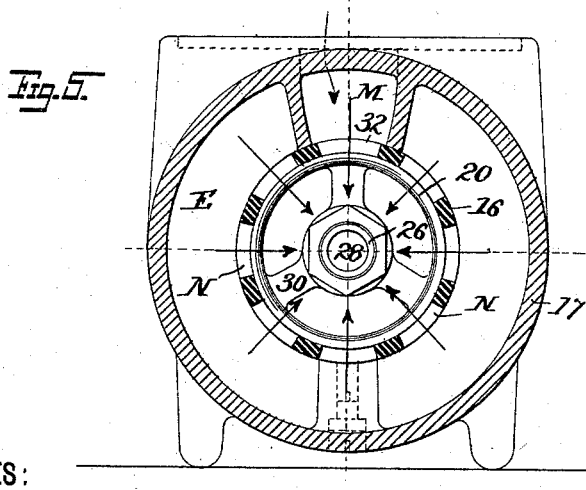
Figure 6:
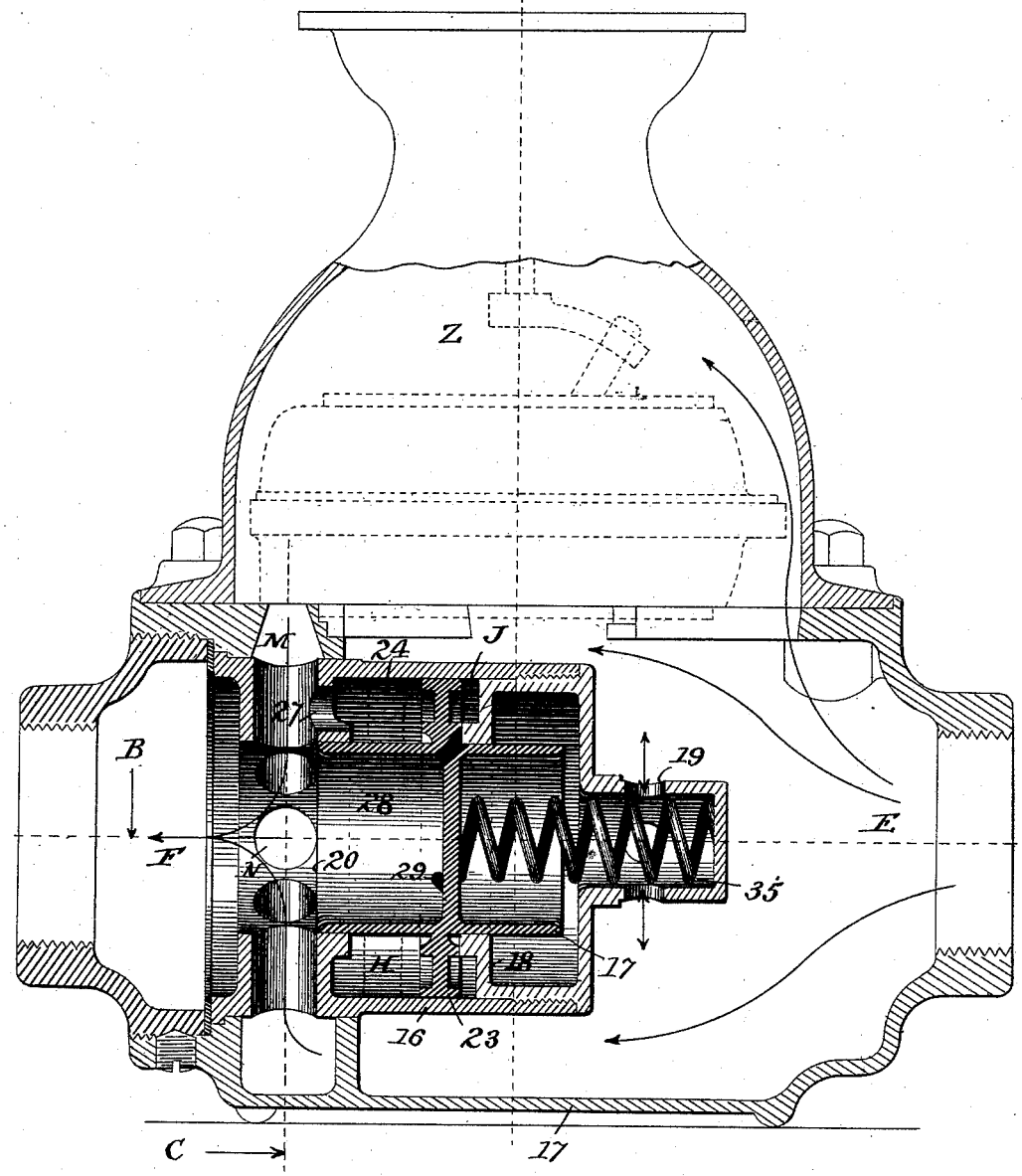

Figure 1 is a vertical longitudinal section of apparatus embodying my invention. Fig. 2 is a top detail plan view, the upper section of the measuring-casing removed. Fig. 3 is a top detail plan view, both sections of the measuring-casing removed. Fig. 4 is a part end elevation from the right-hand side of Fig. 1. Fig. 5 is a transverse sectional view on line A, Fig. 1. Fig. 6 is a vertical longitudinal section showing modifications in the detail of the device, and Fig. 7 is a top plan view of the main casing and a part center horizontal section on line B of Fig. 6. Fig. 8 is a transverse section on line C thereof.

Referring, primarily, to Figs. 1 to 5 of the drawings, the entire valve device D is contained within the valve-casing 16, mounted in the main casing 17. The positive-pressure piston 97 operates in the valve-casing cylinder 18, chamber R of which is placed in direct communication with the main inlet-chamber E by the openings 19. The valve 20, which is an open ring supported on its hub by arms, as 30, operates in a cylinder 21, chamber Q of which opens its full capacity directly to the main outlet-chamber F. The negative-pressure piston 23 operates in the intermediate cylinder 24, the forward end closure of which is effected by the fixed partition 25, through a bearing in which the valve-spindle 26 freely operates. The intermediate chamber H of the valve-casing is suitably connected, as by the opening 27, to the separate controlling-pressure chamber M, while the chamber J is connected to the main outlet-chamber by a channel 28 through the valve-spindle and the lateral openings 29 connected therewith. The object of supporting the valve 20 by the open arms 30 is that the water may be free to displace from one side to the other of the valve. The positive-pressure piston 97 is in fact a plunger extending outwardly from the negative-pressure piston 23, the area of the positive piston being less than that of the negative, and these pistons, taken together, might properly be termed a "differential piston." The object of the channel 28 and openings 29 is to permit the free displacement of water to and fro between chambers J and F. The piston-valve and spindle are connected together to act as one part.

The delivery of the main inlet-chamber E to the main outlet-chamber F is entirely through a series of discharging-ports N, radially disposed and preferably formed in the single transverse plane 31, line A, of the outlet-cylinder of the valve-casing. In the present drawings seven of these ports are shown, which connect directly with the main inlet-chamber, while a remaining port 32 is connected only with a controlling-chamber M, which latter is connected, as by a channel 33, with the discharge-port of a disk water-meter, here termed the "measuring mechanism" Z, while the inlet-port of said mechanism is connected, as by the channel 34, directly to the main inlet-chamber E. As the areas of the ports N 32 are equal each to the other the consequent ratio of the measured to the entire volume is as one to eight.

From the foregoing it will now be clearly seen that all of the discharging-ports will be controlled by the single valve 20, that seven-eighths of the whole volume will pass directly from the outside to the inside of the valve-casing, while the final eigthth portion will first pass through the inlet-channel 34, then through the measuring-chamber of the meter, next by the channel 33 to the controlling-chamber M, then through the discharge-port 32 to chamber Q of the casing, and thence passes on as an integral part of the entire volume through the main outlet-chamber to the pipe.

I will give numerical values to the areas of the positive and negative pistons, as in this wise a more ready comprehension is derived of the operation of the device. Thus assume the area of the positive piston 97 to be 1.00 square inch and the effective area of the negative piston 23—that is, deducting the diameter of the spindle from the full diameter of the piston—equals 2.00 square inches, whence the difference between the piston-faces is 2.00−1.00=1. square inch, the excess of area of the negative piston over that of the positive.

The operation is as follows: Assume the valve in the position indicated by the full lines of Fig. 1, the ports N 32 being partially closed, and that a draft is made upon the outlet-chamber causing an immediate difference of pressure between the main inlet and outlet chambers E and F. Then suppose this difference of pressure between the main chambers to equal one pound to each square inch, whence upon the positive piston there will be one multiplied by one equals one pound, the sum of the power tending to force the valve forward; but concurrent with the foregoing a certain degree of pressure will also have been transmitted through the measuring mechanism to the controlling-chamber M, and thence through the opening 27 to the intermediate chamber H of the valve-casing. The extent of the pressure per unit of surface in the controlling-chamber M will be equal to that of the main inlet-chamber less the power absorbed in passing through the channels and in operating the measuring device. Assume this absorption of pressure in passing from chambers E to M as equal to .25 pound to each square inch, then 1−0.25=0.75, the effective pressure to each unit of surface transmitted into the controlling-chamber. Hence 2×0.75=1.5 pounds the sum of the power exerted upon the negative piston 23 to force the valve backward. Consequently as the sum of the power exerted upon the negative piston 23 is greater than that exerted upon the positive piston the valve will in fact be carried backward, causing the valve 20 to open the ports, which action will continue until the opposing forces are balanced—that is to say, when the sum of the pressure upon the faces of the pistons (not the pressure per unit of surface) will be equal each to the other. During such action water will flow from chamber M to H and be displaced from chamber J to F. Again, if after such a condition of equilibrium has been established there shall from any cause be an increase of resistance to the flow through the measuring mechanism, this by decreasing the quantity discharged into the controlling-chamber decreases the pressure therein, as also in the intermediate chamber H. The further effect of such obstruction in consequence of decreasing the delivery into the controlling-chamber is to increase the pressure in the main inlet-chamber. Therefor as the sum of the power upon the negative piston is decreased while that upon the positive piston is increased, the valve will be driven forward, causing it to throttle all of the ports, which action will be continued, as before, until another position of equilibrium will have been established between the opposing forces.

During any travel of the valve the fluid which enters or is displaced from chamber J passes through the channel 28 in the spindle to or from the main outlet-chamber. Hence the said chamber J is negative to H, the pressure in the chamber J being practically identical with that in the main outlet-chamber. In fact, at rapid rates of flow the pressure in chamber J may be less than that of the main outlet-chamber, owing to induction upon the spindle-channel 28.

From the foregoing it will be seen that the position of the valve with respect to the ports is a resultant of these conditions—namely, the pressure in the main outlet-chamber E, the pressure in the main inlet-chamber F, the pressure in the controlling-chamber M, and the pressures in the valve-casing chambers. Furthermore, that during any constant rate of flow through the meter as a whole any variation of the pressure in the controlling-chamber will result in a coaction of pressure in all of the chambers, the immediate consequence of such coaction of pressures being to cause the valve to throttle to a greater or less degree all of the ports in any instance when the pressure in the controlling-chamber decreases and to cause the valve to open all of the ports to a greater or less degree when the pressure therein increases. In other words, the power absorbed in overcoming the hydraulic and mechanical friction necessary to the operation of the measuring mechanism creates a difference of pressure acting as a balance or governor, which determines the relative position of the valve with respect to the discharging-ports.

In the drawings I have shown a spring 35, which may be employed to coact with the pressure upon the positive piston. It has also another function, which is, in event of the meter being stopped at a rapid rate of flow and leaving the ports open, to force the valve forward and close the ports. The employment of the spring or its equivalent as a weight in no wise affects the described operation of the device, as it but increases the intensity or difference of pressure equal to the measure of its resistance between the main inlet and controlling chambers and that of the main outlet-chamber.

In the application of the valve-casing to the main casing I prefer to dispose it in the axis of the pipe, as the most compact form is thus obtainable, but a trifle larger than the supply-pipe, with little or no complication in casting the main casing. In this wise, too, the machine operations are exceedingly simple, consisting only in boring a cylindrical bearing lengthwise of the casing and adapting the valve-casing thereto.

The object of the set-screw 36 is to prevent the valve-casing from being driven out of its bearings by back-pressure, and also to force it upward to make intimate joint closure with the walls of the controlling-chamber.

I prefer to form the ports circular, as shown, by simply drilling a series of holes through the valve-casing, whose number corresponds to the desired ratio, as in this manner the ratio may be obtained with the utmost accuracy, the several edges being caused to open exactly simultaneously, and while subtending a constant ratio yet affords a small total area at low flows, rapidly but constantly increasing with the rate of delivery.

The controlling advantages derived from this construction and disposal of the valve, valve-casing, and ports yet remain to be pointed out and may be thus summarized: By ejecting the volume from the main inlet-chamber and from the controlling-chamber in a series of jets, which converge in the accurately-finished cylinder of the valve-casing, one jet impinging against another, all finally reacting and passing on through the pipe as one volume, (see arrows,) a perfectly-balanced condition of flow is obtained and that, too, at the precise place and instant where the proportional control is effected. This is a most important feature, as I have found that many heretofore apparently inexplicable fluctuations in the performance of proportional meters were caused by the erratic effects produced by currents of different velocities. This I may illustrate in the instance of two jets discharged under equal pressure past a valve from inside to outside of a casing, one jet impinging against a fixed contiguous wall, the other jet ejected in the general direction of flow. In the former instance a considerable portion of the kinetic energy would be absorbed by shock and eddies, while in the latter instance practically all of the energy would be merged into the common velocity of the main stream. Obviously such effects will increase more or less constantly with the increase in the rate of delivery, and as the velocity through the controlling-passages of proportional meters must be relatively high to accomplish one of the special objects sought (compactness) such erratic disturbances make it much more difficult to maintain an exact proportional measurement by means of automatic apparatus operated by differences of dynamic pressures. In other words, were this not provided for there would be a variable condition with which mechanical appliances could hardly be expected to successfully cope, because such effects establish different intensities of pressure in the same chamber; but by the present simple expedient of causing the entire volume to pass from the outside to the inside of the valve-casing, each particle impinging upon another and all subject to precisely the same deflections, the dynamic condition thus established is nearly, if not quite, theoretically perfect and will bear a constant relation under all rates of delivery. In disposing all of the controlling-ports, both of the measured and of the unmeasured quantities, in a single plane of the valve-casing all the ports governed by the single-valve difficulties of adjustment for "lap" and "lead" are thereby avoided. Then, too, the direction of the flow is toward the center, away from the casing and away from the outlet-piston, the tendency being to wash the piston and carry sand or other foreign substances away therefrom. Furthermore, this feature otherwise very greatly reduces the liability of the pistons to become clogged or worn, in that there is no flow either to or from any of the valve-casing chambers, except only during a shift of the valve, as it will be observed that the positive piston both receives from and displaces back to the main inlet-chamber; that the negative piston both receives from and displaces back to the controlling-chamber, while the actual flow is entirely through the outlet-chamber Q. Thus if the draft is at a constant rate and an ordinarily-constant frictional condition of the measuring mechanism prevails, then the valve would stand as if fixed and the pressure in the valve-casing chambers would be static, excepting only in the outlet-chamber Q of the valve-casing. Moreover, the entire flow will be stopped should the measuring mechanism fail to operate and prevent the measured proportional part from reaching the controlling-chamber, as in such event the inlet-pressure would only be exerted upon the positive piston, driving the valve forcibly forward, closing off all the ports. Neither can the meter be operated backward, as should the outlet be applied to the inlet end of a pipe the pressure would be transmitted to the chamber J, through the channel 28, driving the valve forward toward the pressure and the ports would be kept closed.

The modifications in detail (shown in Figs. 6, 7, and 8) are submitted with some elaboration to indicate the readiness with which the device may be changed in some particulars without departing from the spirit and function thereof, wherefore I do not limit myself to the precise terms and details submitted to illustrate my invention. It is not deemed necessary to make any description of these modifications, as the several details thereof, corresponding to the preceding figures of the drawings, are carefully indicated by the same reference-figures. Obviously the design of the primary figures, to which the description has been more especially directed, is the more compact and less expensive to construct.

What I claim is—

1. In a proportional meter, a valve device having piston-sections and a valve adapted to reciprocate in a valve-casing having chambers, one an end chamber connected to the main inlet-chamber, another an intermediate chamber connected to a separate controlling-chamber which receives the discharge from the measuring mechanism, and a final chamber communicating with the main outlet-chamber, the piston in the first chamber being of less area than that in the intermediate chamber, the valve being actuated by the pistons to open and close the communication with the outlet-chamber, substantially as described.

2. In a proportional meter, the combination of a positive-pressure piston acting in a chamber connected to the main inlet-chamber, a controlling-chamber, a negative piston of greater area than the positive piston, acting in a chamber connected to the controlling-chamber, and a valve acting in a chamber connected to the main outlet-chamber, the said valve controlling the communication with the outlet-chamber, substantially as described.

3. In a proportional meter, a differential piston having one end exposed to the pressure of the main inlet-chamber and its other end arranged to receive pressure from a controlling-chamber receiving the discharge from the measuring mechanism, the area of the piston which receives pressure from the controlling-chamber being greater than that of the end exposed to the main inlet-chamber, and a valve acting in the outlet-chamber to vary the proportional area of the discharging-ports, according to the variations of pressure in the several said chambers, substantially as described.

4. The combination, in a meter, of a series of chambers and pistons moving therein, and a controlling-chamber receiving a limited portion of the fluid, one piston receiving the pressure of the inlet-chamber, another piston receiving the pressure from the controlling-chamber, and a valve controlling the entire discharge to the outlet, substantially as described.

5. The combination, with the measuring mechanism, main casing, differential piston, valve, and valve-casing, of the main inlet-chamber, the controlling-chamber, and the main outlet-chamber, the arrangement and construction being such that the main inlet-chamber is connected to the measuring mechanism and to the lesser piston area, the controlling-chamber being connected to the greater piston area, to the outlet from the measuring mechanism, and to a valve-port in the valve-casing, while the main outlet-chamber is connected by a series of ports controlled by a valve to the main inlet-chamber and to the controlling-chamber, substantially as described.

6. The combination, with the main inlet-chamber and the inlet and outlet channels, of the measuring mechanism, the controlling-chamber, and the valve-casing chambers of the valve device provided with a differential piston, one end connected to the main inlet-chamber, the other end, the section of greater area, connected to the controlling-chamber, and the valve acting in a ported cylinder, substantially as described.

7. In a proportional meter, a valve device having a differential piston and a valve, each operating in separate chambers when both the measured and the inferred volumes pass through but one of the chambers, substantially as described.

8. In a proportional meter, a valve device having a differential piston and a valve, each operating in separate chambers, one of said chambers receiving and displacing from and to the main inlet-chamber, another of said chambers receiving and displacing from and to the controlling-chamber, while the third chamber receives from both the main inlet-chamber and the controlling-chamber, but delivers into the main outlet-chamber, substantially as described.

9. The combination of the negative piston 23, valve-casing chambers J H, and the main outlet-chamber F, with a connecting-channel, as 28, between chambers J and F for the purpose of making the pressure within the said chamber J negative to chamber H, substantially as described.

10. The combination, with the differential pistons, valve-casing, main inlet-chamber, and controlling-chamber, of the valve directly connected to the differential pistons and actuated thereby to vary the area of the discharging-ports, substantially as described.

11. The valve and valve-casing having a series of valve-ports disposed radially in a single transverse plane of the casing, the disposal and construction being such that the entire flow of both the measured and the inferred volumes is delivered through the said valve-ports from outside to inside of the valve-casing, substantially as described.

12. The combination of the spring with the differential piston, the valve, and the valve-casing, the disposal being such that the spring coacts with the pressure from the main inlet-chamber to force the valve forward toward the main outlet-chamber, substantially as described.

13. The combination, with the differential piston and the valve-casing, of the openings, as 19, for connecting the pressure of the main inlet-chamber to the positive piston of the valve device, substantially as described.

14. In a proportional meter, the combination, with the measuring mechanism and the main casing, of the valve device, and the valve-casing mounted in a cylindrical bearing formed in the axis of the main casing, the chambers of the said valve device being connected to the discharge of the measuring mechanism, substantially as described.

15. In a proportional meter, the combination, with the valve-casing and valve therein, of a series of ports radially disposed in a single transverse section of the casing, the number of the said ports corresponding to the proportional ratio of the meter, substantially as described.

16. In a proportional meter, a main inlet-chamber, a controlling-chamber, and a valve controlling a series of ports communicating with the inlet and the controlling chambers and arranged to direct the total flow in streams of uniform character, substantially as described.

17. In a proportional meter, a main inlet-chamber, a controlling-chamber, a valve, and a series of ports communicating with the inlet and the controlling chambers and arranged to direct the total flow in equal streams, converging toward the center of the flow, substantially as described.

In testimony whereof I have signed my name to this specification in the presence of two subscribing witnesses.

JOHN THOMSON.

Witnesses:
HERMAN T. C. KRAUS,
ROBERT S. CHAPPELL.